(12) United States Patent
Sato

(10) Patent No.: US 7,893,921 B2
(45) Date of Patent: Feb. 22, 2011

(54) INPUT DEVICE

(75) Inventor: Tadamitsu Sato, Tokyo (JP)

(73) Assignee: Alps Electric Co., Ltd., Tokyo (JP)

( * ) Notice: Subject to any disclaimer, the term of this patent is extended or adjusted under 35 U.S.C. 154(b) by 1017 days.

(21) Appl. No.: 11/132,693

(22) Filed: May 19, 2005

(65) Prior Publication Data

US 2005/0259081 A1    Nov. 24, 2005

(30) Foreign Application Priority Data

May 24, 2004   (JP) ............................. 2004-152822

(51) Int. Cl.
*G09G 5/00* (2006.01)
(52) U.S. Cl. ...................... 345/156; 345/173
(58) Field of Classification Search ............... 345/76, 345/156, 173
See application file for complete search history.

(56) References Cited

U.S. PATENT DOCUMENTS

| | | | | |
|---|---|---|---|---|
| 4,752,655 | A | * | 6/1988 | Tajiri et al. ................... 345/174 |
| 4,903,012 | A | * | 2/1990 | Ohuchi ........................ 345/178 |
| 6,621,484 | B1 | * | 9/2003 | Yee ............................. 345/168 |
| 6,704,005 | B2 | | 3/2004 | Kato et al. |
| 7,339,577 | B2 | * | 3/2008 | Sato et al. ................... 345/173 |
| 2002/0180707 | A1 | * | 12/2002 | Sato et al. ................... 345/169 |
| 2004/0155869 | A1 | * | 8/2004 | Robinson et al. ............ 345/168 |
| 2004/0189619 | A1 | * | 9/2004 | Yun ............................ 345/179 |

* cited by examiner

*Primary Examiner*—Amare Mengistu
*Assistant Examiner*—Insa Sadio
(74) *Attorney, Agent, or Firm*—Brinks Hofer Gilson & Lione

(57) ABSTRACT

An input device contains a plurality of push switch elements that are connected to a single switch signal line. When a switch signal is detected from the switch signal line, it is determined which push switch element is enabled based on coordinate data obtained from a primary input sensor. By using the coordinate data, only a single switch signal line is used to determine which push switch element is enabled.

4 Claims, 5 Drawing Sheets

INPUT DEVICE

This application claims the benefit of priority to Japanese Patent Application No. 2004-152822 filed on May 24, 2004, herein incorporated by reference.

BACKGROUND OF THE INVENTION

1. Field of the Invention

The present invention relates to an input device having primary input means serving as a coordinate input unit and secondary input means having a plurality of push switch elements.

2. Description of the Related Art

Japanese Unexamined Patent Application Publication No. 2002-123363 is directed to an input device for use in, for example, portable telephones. The input device disclosed in this publication includes an electrostatic-capacitance or pressure-sensitive flat input unit 4, a cover sheet 7 formed on a surface of the flat input unit 4, and switch elements 11 used for a switch input operation (see FIGS. 2 and 7 of the publication).

In the above-noted publication, as recited in paragraph number [0022], the flat input unit 4 has a coordinate input capability, and has functions for inputting numbers and characters by pressing indicator keys 8 shown in FIG. 1 of this publication and for scrolling a view displayed on a display panel 3 by changing to a certain mode (see paragraph numbers [0030] to [0032], etc.).

When the switch elements 11 are pressed and turned on, for example, as recited in paragraph number [0043], only a press of the switch elements 11 is sensed while ignoring a coordinate input signal generated by the flat input unit 4. A press of the switch elements 11 serves as, for example, a "set" button.

Generally, the switch elements 11 are connected to separate signal lines, and these signal lines are connected to a switch position detector in a controller. When a switch signal is detected, the switch position detector determines which switch element 11 is turned on based on the signal line carrying the switch signal.

An input device to be incorporated in a compact electronic apparatus, e.g., a portable telephone, should also be small. Thus, the larger the number of switch elements 11 is, the more difficult it is to design the wiring of the signal lines corresponding to the switch elements 11 in the input device within a limited space.

It is also unavoidable to change the design of a controller for detecting switch signals when the number of switch elements 11 changes.

The switch signal lines individually provided for the switch elements 11 experience another problem in that noise is liable to occur.

SUMMARY OF THE INVENTION

Accordingly, it is an object of the present invention to provide an input device that only requires a single switch signal line to allow for determination of an enabled switch using coordinate data output from a primary input unit.

An input device according to the present invention includes a cover sheet having an operation surface on a surface thereof, a primary input unit formed below the cover sheet, capable of inputting coordinates, and a secondary input unit formed below the primary input unit, having a plurality of push switch elements. The push switch elements are connected to a switch signal line, and the number of switch signal lines is smaller than the number of push switch elements. When the operation surface is pressed towards the secondary input unit to enable one of the push switch elements and a switch signal from the switch signal line is detected, the enabled push switch element is determined based on the coordinate data obtained from the primary input unit.

According to the present invention, the number of switch signal lines is smaller than the number of push switch elements, and the coordinate data is used to determine which push switch element is enabled although the position of the enabled switch cannot be identified from the switch signal lines. This contributes to reduction in size of the input device. It is not necessary to change the controller design. Moreover, an input device with less noise can be realized.

Preferably, all push switch elements are connected to a single switch signal line. By using the coordinate data, a single switch signal line is only required to determine which push switch element is enabled.

Preferably, the input device further includes a coordinate data corrector that corrects for the coordinate data received from the primary input unit by a predetermined algorithm.

The coordinate data corrector preferably has an algorithm for averaging a plurality of previous coordinate data. Alternatively, the coordinate data corrector preferably has an algorithm for determining the coordinate data using only upper bits of bit data corresponding to the coordinate data while ignoring a predetermined lower bit.

When an operator presses an operation surface, the operator may unintentionally press a point different from the desired point on the operation surface due to his/her pressing habit, etc., and incorrect coordinate data may therefore be output. In this case, an error signal indicating that a switch element that is not enabled has been pressed may be output. In particular, when the space between the switch elements is narrow, an error signal indicating that the switch adjacent to the enabled switch has been pressed may be output. Preferably, for example, the coordinate data received from the primary input unit is compensated for variations in the coordinate data by averaging a plurality of previously received coordinate data to improve the detection accuracy of the switch position.

The primary input unit may be, for example, an electrostatic-capacitance sensor. Electrostatic-capacitance sensors may, in particular, cause positional deviation of the coordinate data. The coordinate data corrector is effective to improve the detection accuracy of the switch position.

In the present invention, a plurality of push switch elements are connected to a switch signal line or switch signal lines, where the number of switch signal lines is smaller than the number of push switch elements. When a switch signal is detected from the switch signal line, it can be determined which push switch element is enabled based on coordinate data obtained from the primary input unit.

DESCRIPTION OF THE PREFERRED EMBODIMENTS

Figure 1:
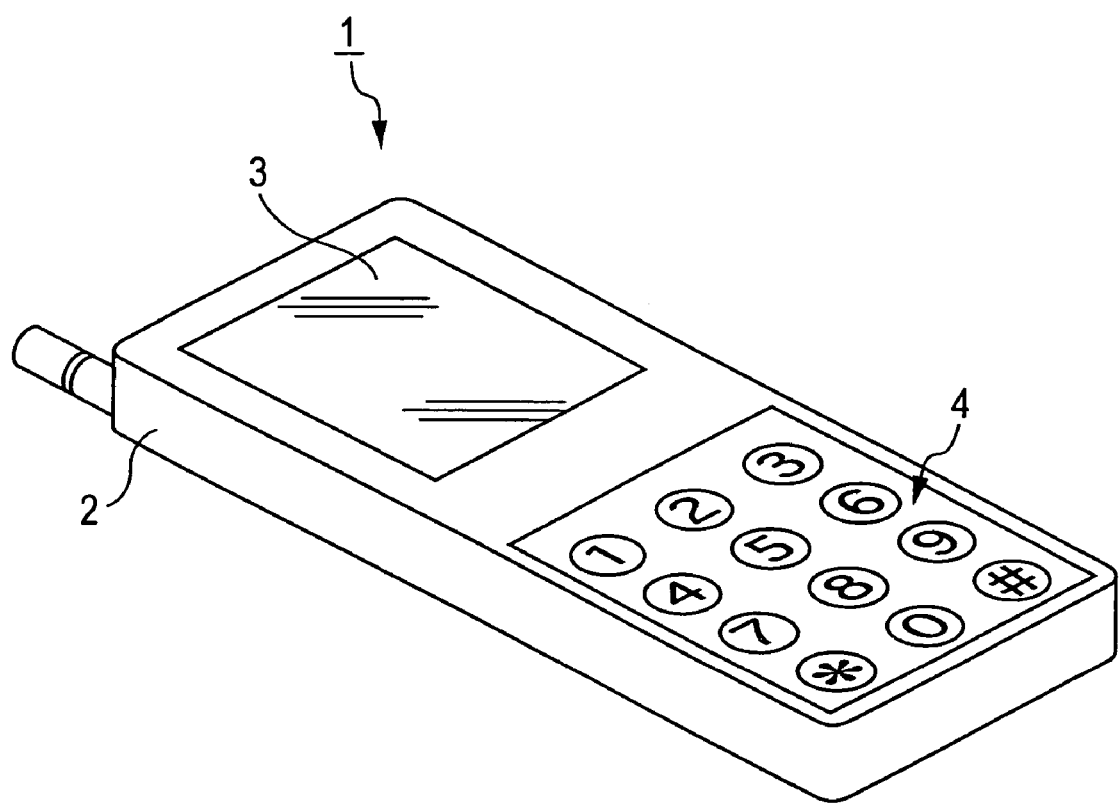
FIG. 1 is a partially perspective view of a portable telephone having an input device according to the present invention.
Figure 2:
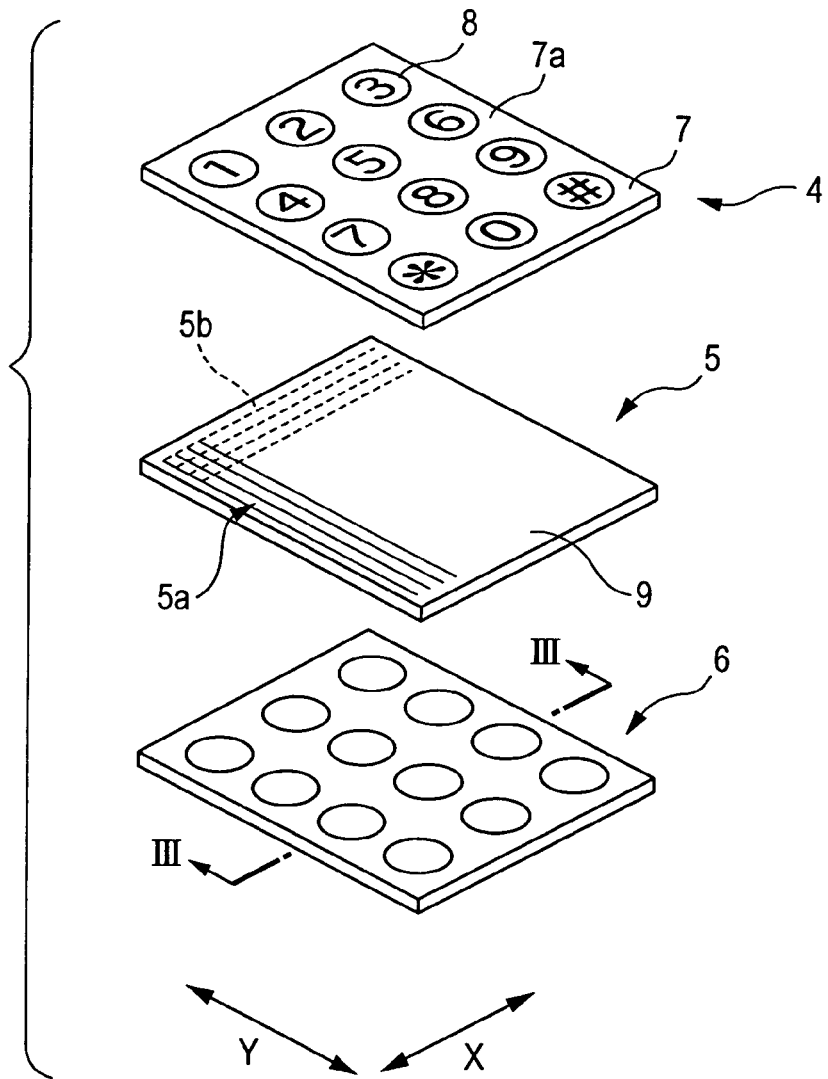
FIG. 2 is a partially exploded perspective view of the input device according to the present invention.
Figure 3:
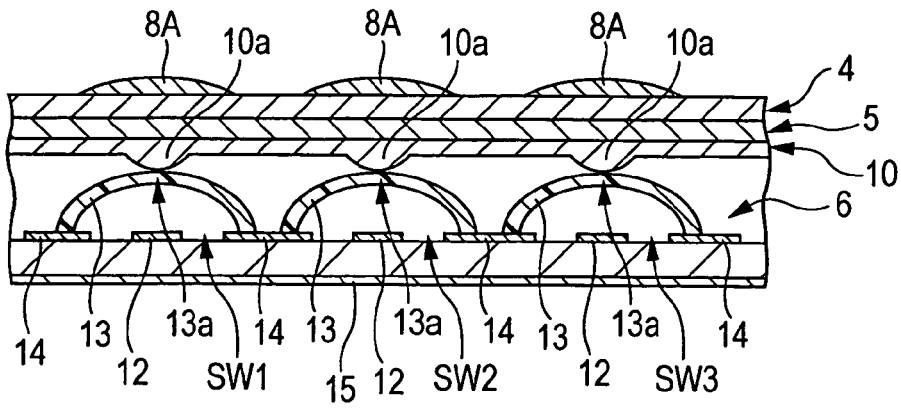
FIG. 3 is a partially cross-sectional view of the input device shown in FIG. 2, taken along a line III-III.
Figure 4:
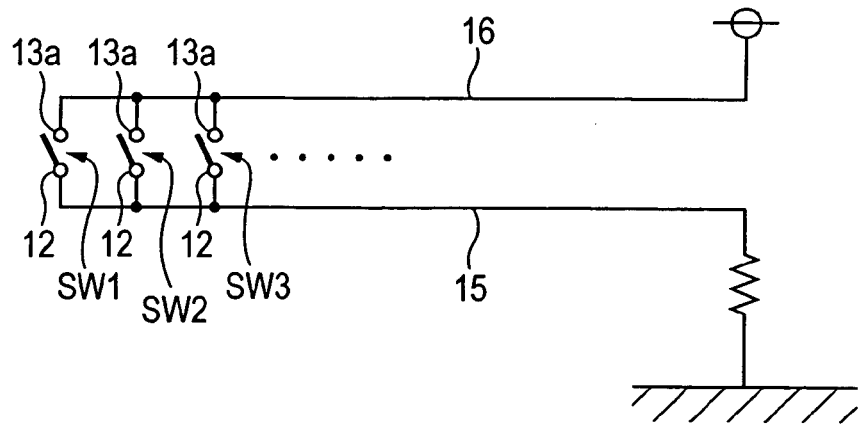
FIG. 4 is an electrical circuit diagram of a secondary input switch.
Figure 5:
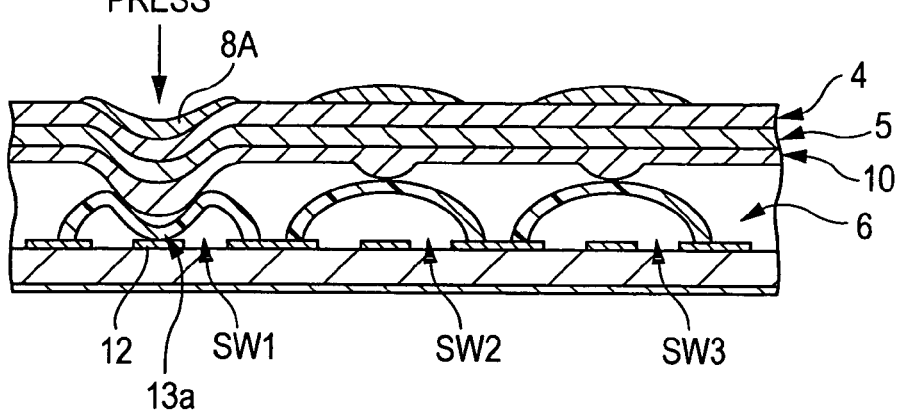
FIG. 5 is a partially cross-sectional view of the input device shown in FIG. 3 that is pressed.
Figure 6:
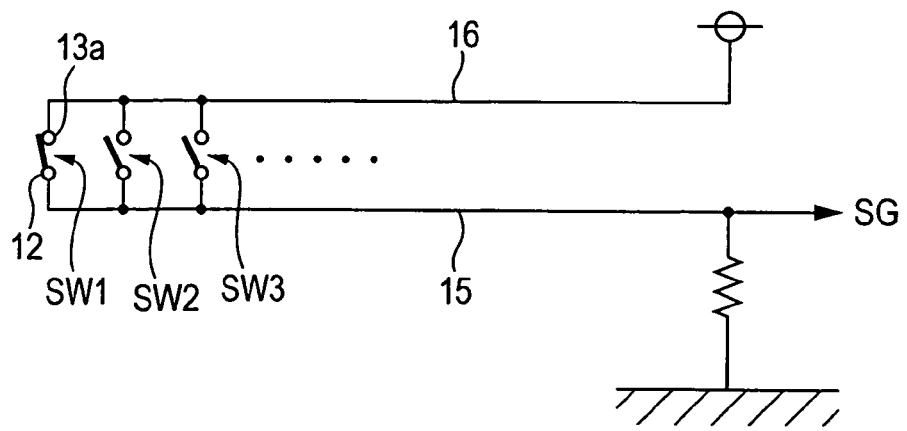
FIG. 6 is an electrical circuit diagram of the secondary input switch when the input device shown in FIG. 3 is in a switch input mode.
Figure 7:
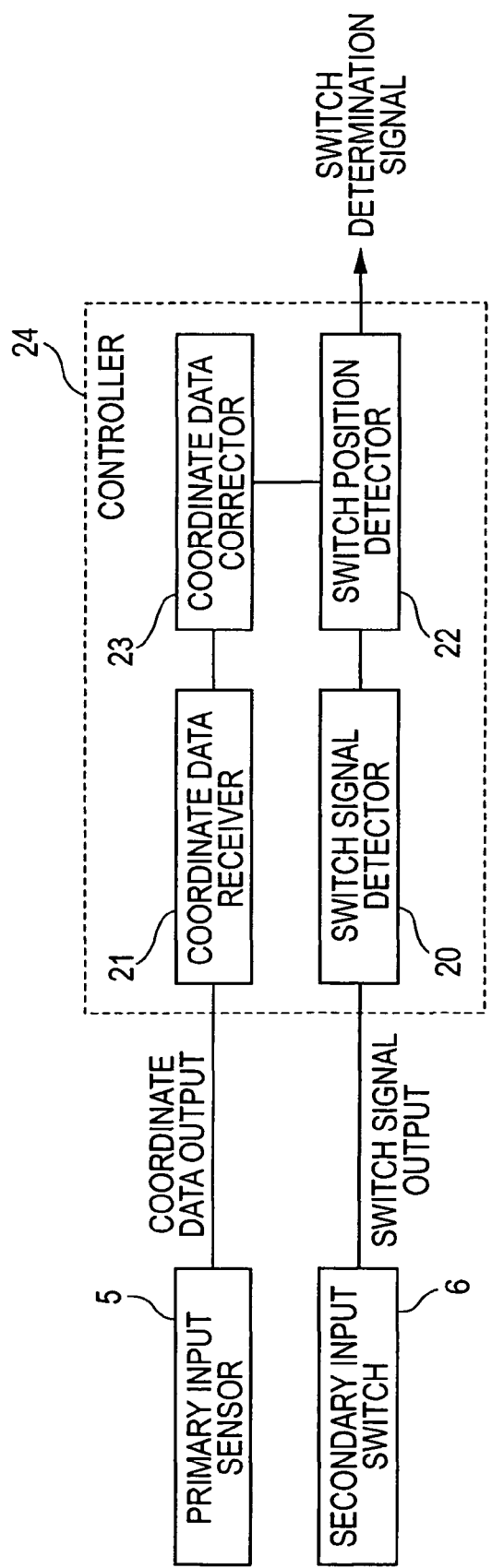
FIG. 7 is a block diagram of the input device according to the present invention.
Figure 8:
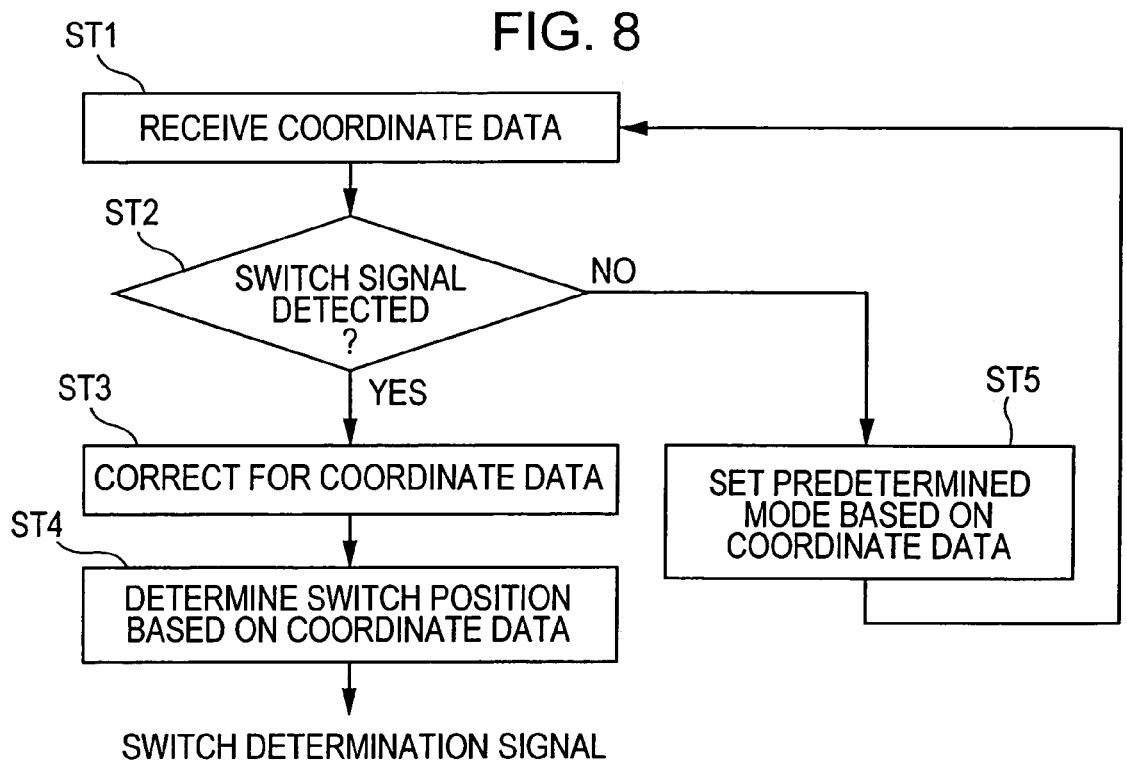
FIG. 8 is a flowchart showing a flow of processing from reception of coordinate data to detection of a switch position.
Figure 9:
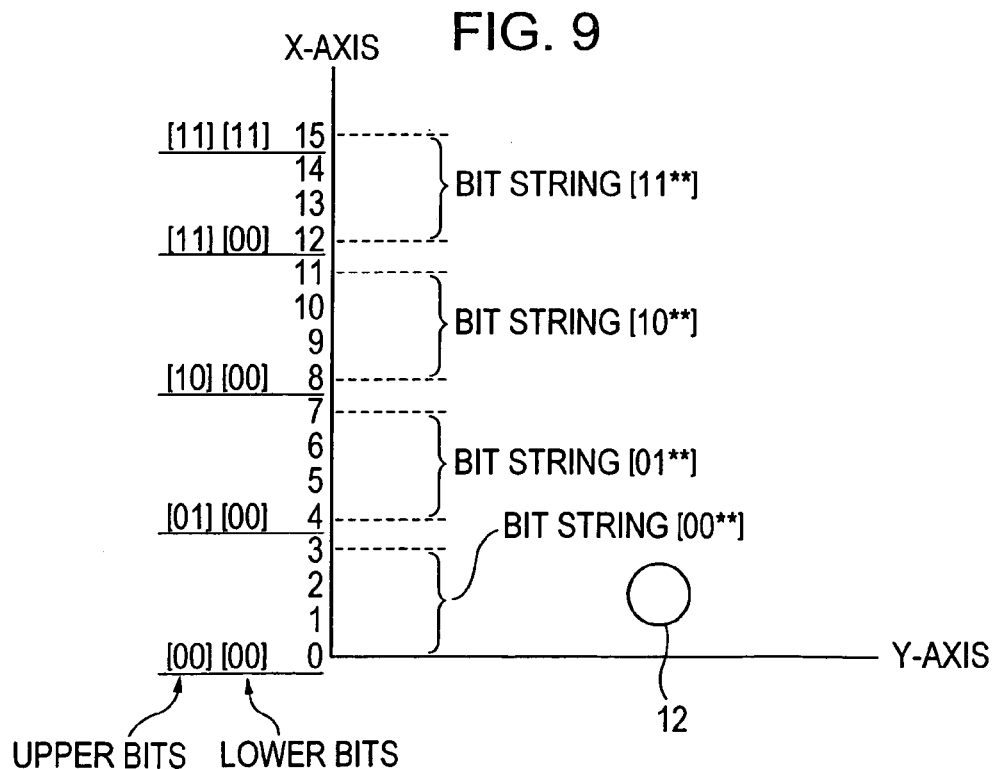
FIG. 9 is a diagram showing a coordinate data correcting operation according to the present invention.

FIG. 1 is a partially perspective view of a portable telephone 1 having an input device according to the present invention, FIG. 2 is a partially exploded perspective view of the input device, FIG. 3 is a partially cross-sectional view of the input device shown in FIG. 2, taken along a line III-III, FIG. 4 is an electrical circuit diagram of a second input unit, FIG. 5 is a partially cross-sectional view of the input device shown in FIG. 3 that is pressed, FIG. 6 is an electrical circuit diagram of the second input unit when the input device shown in FIG. 3 is in a switch input mode, FIG. 7 is a block diagram of the input device, FIG. 8 is a flowchart showing a flow of processing from reception of coordinate data to detection of a switch position, and FIG. 9 is a diagram showing a coordinate data correcting operation according to the present invention.

The portable telephone 1 shown in FIG. 1 has a case 2 on which a display panel 3 serving as a display unit and an input device 4 are mounted. The display panel 3 may be a monochrome or color liquid crystal (LC) panel or an electroluminescent (EL) panel.

The input device 4 is used to input information. In this embodiment, the input device 4 includes a primary input sensor 5 (primary input means) and a secondary input switch 6 (secondary input means).

A cover sheet 7 shown in FIG. 2 is formed of a resin sheet made of, for example, polyethylene terephthalate (PET), a silicon rubber, or the like, and has a plurality of indicator keys 8 serving as input sections for inputting characters, numbers, and symbols. The indicator keys 8 are formed on a surface (operation surface 7a) of the cover sheet 7 by a printing or transferring process. The indicator keys 8 are defined by circular frames indicating input sections in which characters, numbers, and symbols are printed or transferred.

The cover sheet 7 may be unevenly designed so that the indicator keys 8 project, or may be designed so that rubber projections 8A having characters, numbers, and symbols printed or transferred thereon are fixed in the manner shown in FIG. 3 on the surface of the cover sheet 7.

The primary input sensor 5 shown in FIG. 2 is of the electrostatic capacitance type or the pressure-sensitive type that allows coordinate input. In a case of an electrostatic capacitance sensor, an X-direction detection electrode 5a and a Y-direction detection electrode 5b, which are pasted with Ag (silver), face each other in a matrix with a resin sheet 9 therebetween. The resin sheet 9 is, for example, a PET sheet having an insulating property and having a predetermined dielectric constant.

The resin sheet 9 is formed on a substrate having a conductor pattern, and the electrodes 5a and 5b are connected to the conductor pattern formed on the substrate. A dielectric member, such as the operator's finger, touching the indicator keys 8 causes a change in the electrostatic capacitance between the X-direction detection electrode 5a and the Y-direction detection electrode 5b, thus allowing for an X-Y coordinate input.

The primary input sensor 5 shown in FIG. 2 may be a pressure-sensitive sensor. In this case, the primary input sensor 5 includes a resistor having a potential difference in the X and Y directions, and a conductor facing the resistor. When the input device 4 is pressed by the operator's finger, the conductor and the resistor are brought into contact with each other to change the resistance, thus allowing for a coordinate input.

As shown in FIG. 3, an insulating sheet 10 made of, for example, resin is formed on the opposite surface of the primary input sensor 5. The insulating sheet 10 has projections (trim pieces) 10a on the opposite surface thereof at positions facing fixed electrodes 12 of push switch elements SW1, SW2, SW3, . . . (hereinafter, sometimes, collectively referred to as "push switch elements SW"), described below, in the thickness direction so that the projections 10a project towards the fixed electrodes 12.

In the secondary input switch 6 shown in FIGS. 2 and 3, the fixed electrodes 12 and flexible electrodes 13 corresponding to the fixed electrodes 12 are formed on, for example, the upper surface of a PET resin sheet.

The fixed electrodes 12 are substantially circular, and are surrounded a predetermined distance apart by substantially ring surrounding electrodes 14. As shown in FIG. 3, the flexible electrodes 13 having a dome shape (diaphragm configuration) are formed on the surrounding electrodes 14.

As shown in FIG. 3, the dome-shaped flexible electrodes 13 have centers 13a aligned with the fixed electrodes 12 in the thickness direction. That is, the fixed electrodes 12, the centers 13a of the flexible electrodes 13, and the projections 10a of the resin sheet 10 are aligned in the thickness direction.

As shown in FIG. 3, the adjacent surrounding electrodes 14 are electrically connected, and the plurality of flexible electrodes 13 are therefore electrically connected via the surrounding electrodes 14.

As shown in FIG. 3, a common electrode 15 (switch signal line) is formed on the opposite surface of the resin sheet. The common electrode 15 and the fixed electrode 12 are electrically connected.

FIG. 4 is an electrical circuit diagram of the secondary input switch 6. As shown in FIG. 4, the push switch elements SW1, SW2, SW3, . . . are connected in parallel between a power supply line 16 and a switch signal line 15. The power supply line 16 is formed so as to have the flexible electrodes 13, the surrounding electrodes 14, and a conductor pattern (not shown) formed on the resin sheet.

For example, the push switch elements SW1, SW2, SW3, . . . are placed at positions facing the indicator keys 8 in the thickness direction in the manner shown in FIG. 2.

When the input device 4 is not operated, as shown in FIG. 3, the cover sheet 7 and the primary input sensor 5 are not deformed, and the flexible electrodes 13 of the push switch elements SW are still dome-shaped.

For example, when the indicator key 8 of "7" shown in FIG. 2 is pressed down by the operator's finger or using a pen, as shown in FIG. 5, the cover sheet 7 and the primary input sensor 5 are deformed to define a recess. This pressure forces the flexible electrode 13 of the push switch element SW1 to be inverted downwards, and a pressing force higher than a predetermined level brings the center 13a of the flexible electrode 13 into contact with the fixed electrode 12 below the flexible electrode 13.

Thus, the flexible electrode 13 and the fixed electrode 12 of the push switch element SW1 are brought into conduction to turn on the switch element SW1, as shown in FIG. 6, to output a switch signal SG.

When the flexible electrode 13 is inverted downwards in the manner shown in FIG. 5, a pressure reaction is produced from the flexible electrode 13. The pressure reaction is transmitted to the operator's finger, and causes the operator to experience tactile feedback to ensure that a pressing sensation is produced in the operator.

The features of the present invention will be described.

In a case where the primary input sensor 5 is an electrostatic capacitance sensor, the electrostatic capacitance changes at the pressed point shown in FIG. 5, and coordinate data indicating the pressed point is received by a coordinate data receiver 21 in a controller 24 shown in FIG. 7 (step ST1 in FIG. 8).

The input device 4 according to the present invention operates in a predetermined mode. In this mode, for example, a cursor on the display panel 3 moves along with movement of the operator's finger moving on the operation surface 7a shown in FIGS. 1 and 2, and when the cursor is placed on an icon on the display panel 3 and, for example, the indicator key 8 of "1", which serves as a "set" button, is pressed down, the switch element SW corresponding to this indicator key 8 is turned on (or is enabled) to open the icon on the display panel 3.

In this mode, the coordinate data receiver 21 in the controller 24 shown in FIG. 7 constantly reads coordinate data, and the cursor moves on the display panel 3 based on the coordinate data unless a switch signal detector 20 detects the switch signal SG.

In the present invention, as shown in FIG. 4, the plurality of push switch elements SW are connected to the single switch signal line 15. When the operator's finger stops at the indicator key 8 of "1" shown in FIG. 2 and presses down this indicator key 8, the switch element SW corresponding to the indicator key 8 of "1" is enabled and the switch signal SG is output from the switch signal line 15, as shown in FIG. 6.

In the present invention, unlike an input device of the related art in which switch signal lines are individually provided for switch elements, all switch elements SW are connected to the single switch signal line 15. Thus, the same switch signal SG is output from the switch signal line 15 whichever switch element SW is enabled.

As shown in FIG. 7, when the switch signal detector 20 in the controller 24 detects the switch signal SG (step ST2 in FIG. 8), a switch position detector 22 in the controller 24 determines which switch element SW is enabled based on the coordinate data received by the coordinate data receiver 21 indicating the currently pressed point (step ST4 in FIG. 8).

When the switch position detector 22 determines that the switch element SW corresponding to the indicator key 8 of "1" is enabled, a switch determination signal indicating the switch element SW corresponding to the indicator key 8 of "1" is transmitted to a central processing unit (CPU) (not shown). The CPU determines that the "set" button to open the icon has been pressed, and opens the icon on the display panel 3.

In the present invention, therefore, all push switch elements SW are connected to the single switch signal line 15. When one push switch element SW is enabled by a pressing force and the switch signal SG is detected from the switch signal line 15, the position of the enabled push switch element SW is determined based on the coordinate data obtained from the primary input sensor 5.

Thus, unlike an input device of the related art, by using the coordinate data, the single signal line 15 for the switch elements SW, rather than separate signal lines, is only required to determine which switch element SW is enabled. Therefore, the input device 4 can become compact without requiring complicated wiring of a signal line if the number of switch elements SW increases.

The single signal line 15 is connected from the secondary input switch 6 to the controller 24 if the number of switch elements SW changes. Therefore, it is not necessary to change the design of the controller 24.

Moreover, the single signal line 15 provided for the switch elements SW, rather than separate signal lines, suppresses the occurrence of noise.

In the present invention, the number of signal lines 15 is at least smaller than the number of switch elements SW, which contributes to simple signal line design and reduction in size of the input device 4 over the related art.

For example, in a case where ten switch elements SW are provided, five switch elements SW are connected to each of two signal lines 15. When any of the switch elements SW is enabled, although the position of the enabled switch element SW cannot be identified by the switch signal SG from the corresponding signal line 15 because the switch elements SW are not connected to individual signal lines, the enabled switch element SW can be determined using the coordinate data.

On the operation surface 7a, the operator may unintentionally press a point different from the desired point due to his/her pressing habit, etc., and incorrect coordinate data may be output. In this case, an error signal indicating that a switch element that is not enabled has been pressed may be output. In particular, when the space between the switch elements SW is narrow, an error signal indicating that the switch adjacent to the enabled switch has been pressed may be output.

In the present invention, therefore, as shown in FIG. 7, the controller 24 preferably includes a coordinate data corrector 23 for correcting for the coordinate data obtained from the primary input sensor 5 using a predetermined algorithm.

In a data correction process, as shown in FIG. 8, after coordinate data is received (step ST1) and a switch signal is detected (step ST2), the coordinate data is corrected for (step ST3). If no switch signal is detected, the coordinate data is not corrected for, and the predetermined mode is set based on the received coordinate data (e.g., movement of the cursor) (step ST5). Then, the process returns to step ST1 to repeat processing of steps ST1, ST2, and ST5 until a switch signal is detected.

A specific example of the predetermined algorithm performed by the coordinate data corrector 23 will be described. For example, an algorithm for averaging a plurality of previous coordinate values may be used.

In this algorithm, coordinate data received a plurality of times at predetermined intervals are stored in a recording unit (not shown), and the coordinate data are averaged to obtain mean information of the irregular coordinate data caused by positional deviation. For example, when the operator's finger presses the indicator key 8 of "1" shown in FIG. 2, the last coordinate value out of ten coordinate values received at predetermined intervals is received as coordinate data indicating the position near the indicator key 8 of "2" because the operator unconsciously bends his/her finger during the pressing operation. In this case, the last coordinate data is compensated for by averaging this last coordinate value and the previous nine coordinate values, and the corrected coordinate data is sensed as coordinate data indicating the indicator key

8 of "1". The position of the enabled switch element SW can therefore be determined based on the corrected coordinate data.

Alternatively, an algorithm in which predetermined lower bits of bit data corresponding to coordinate data are ignored and only the upper bits are used to determine the coordinate data may be used.

For example, as shown in FIG. 9, a resolution of 16 bits for X-axis and Y-axis coordinates (only the X-axis coordinate is shown in FIG. 9) is given. In each bit string, the lower two bits are ignored and only the upper two bits are enabled.

That is, a bit string for the zero bit to the third bit is shown as [00], a bit string for the 4th bit to the 7th bit is shown as [01], a bit string for the 8th bit to the 11th bit is shown as [10], and a bit string for the 12th bit to the 15th bit is shown as [11], where * indicates the ignored bit.

As shown in FIG. 9, the fixed electrodes 12 constituting the switch elements SW are provided in a resolution region having the same bit string. Thus, if a positional deviation occurs in the resolution region having the same bit string, the same coordinate data as the coordinate data to be output when no positional deviation occurs is output. Based on this coordinate data in which the predetermined lower bits are ignored to thereby reduce the resolution, the enabled switch element SW can correctly be determined.

The 16-bit resolution shown in FIG. 9 is merely an example, and the X and Y coordinates are actually defined by a higher resolution. Also in this case, it is determined which switch element is enabled based on the coordinate data in which predetermined lower bits are ignored to thereby reduce the resolution.

In particular, in a case where the primary input sensor 5 is an electrostatic capacitance sensor, coordinate data may experience a deviation or variation due to slight motion of the operator's finger. In this case, the coordinate data corrector 23 is effective to improve the detection accuracy of the switch position.

In the embodiment described above, as shown in the flowchart of FIG. 8, first, coordinate data is received (step ST1), and it is then determined whether or not a switch signal has been output (step ST2). If a switch signal has been output, the position of the switch element 11 that is enabled is determined based on the coordinate data. Conversely, it may first be determined whether or not a switch signal has been output, and the received coordinate data may then be checked for to determine the position of the switch element 11 that is enabled based on the coordinate data.

The secondary input switch 6 is not necessarily designed so that the plurality of switch elements SW are formed on a single sheet in the manner shown in FIG. 2. The switch elements SW may individually be formed on separate sheets. Alternatively, the secondary input switch 6 may be a membrane switch having an upper electrode and a lower electrode between two substrate sheets.

The cover sheet 7 may have projections (trim pieces) projecting downwards on a lower surface thereof so as to correspond to the indicator keys 8, and the primary input sensor 5 may have holes corresponding to the projections of the cover sheet 7 so that the projections face the dome-shaped flexible electrodes 13 constituting the push switch elements SW via the holes. In this case, the resin sheet 10 having the projections 10*a* shown in FIG. 3 is not provided.

While the controller 24 includes the coordinate data corrector 23, the coordinate data corrector 23 may be incorporated in the primary input sensor 5.

What is claimed is:

1. An input device comprising:
a cover sheet having an operation surface on a surface thereof;
primary input means formed below the cover sheet, capable of inputting coordinates;
secondary input means formed below the primary input means, having a plurality of push switch elements; and
coordinate data correcting means for correcting coordinate data received from the primary input means by a predetermined algorithm,
wherein all the push switch elements are connected to a single switch signal line, the number of switch signal lines being smaller than the number of push switch elements,
when the operation surface is pressed towards the secondary input means to enable one of the push switch elements and a switch signal from the switch signal line is detected, the enabled push switch element is determined based on coordinate data obtained from the coordinate data correcting means,
a controller includes a coordinate data receiver and a switch signal detector; the coordinate data receiver constantly reads the coordinate data from the primary input means; when the switch signal detector receives a detection signal from the secondary input means, the coordinate data correcting means performs the correction for coordinate data obtained by the coordinate data receiver, and the controller determines a switch determination signal that is enabled on the basis of corrected coordinate data outputted by the coordinate data correcting means and outputs the switch determination signal; and where the switch signal detector does not receive a detection signal from the secondary input means, the coordinate data correcting means does not perform the correction for coordinate data obtained by the coordinate data receiver, and the controller causes a cursor to move on a display panel on the basis of the coordinate data obtained by the coordinate data receiver, and
the coordinate data correcting means has an algorithm for averaging a plurality of previous coordinate data after the switch signal is detected.

2. The input device according to claim 1, wherein the primary input means comprises an electrostatic capacitance sensor.

3. The input device according to claim 1, wherein the secondary input means includes a resin sheet having fixed electrodes and surrounding electrodes formed on a surface thereof, and dome-shaped flexible electrodes formed so as to face the fixed electrodes and electrically connected to the surrounding electrodes, and
wherein the single switch signal line is formed on a surface of the resin sheet opposite to the surface on which the fixed electrodes and the surrounding electrodes are formed, and is electrically connected to the fixed electrodes.

4. An input device comprising:
a cover sheet having an operation surface on a surface thereof;
primary input means formed below the cover sheet, capable of inputting coordinates;
secondary input means formed below the primary input means, having a plurality of push switch elements; and
coordinate data correcting means for correcting for coordinate data received from the primary input means by a predetermined algorithm, wherein all the push switch elements are connected to a single switch signal line, the number of switch signal lines being smaller than the number of push switch elements, when the operation surface is pressed towards the secondary input means to enable one of the push switch elements and a switch signal from the switch signal line is detected, the enabled push switch element is determined based on coordinate data obtained from the coordinate data correcting means, a controller includes a coordinate data receiver and a switch signal detector; the coordinate data receiver constantly reads the coordinate data from the primary input means; when the switch signal detector receives a detection signal from the secondary input means, the coordinate data correcting means performs the correction for coordinate data obtained by the coordinate data receiver, and the controller determines a switch determination signal that is enabled on the basis of corrected coordinate data outputted by the coordinate data correcting means and outputs the switch determination signal; and where the switch signal detector does not receive a detection signal from the secondary input means, the coordinate data correcting means does not perform the correction for coordinate data obtained by the coordinate data receiver, and the controller causes a cursor to move on a display panel on the basis of the coordinate data obtained by the coordinate data receiver, the coordinate data correcting means has an algorithm for determining the coordinate data using only upper bits of bit data corresponding to the coordinate data while ignoring a predetermined lower bit.

* * * * *